Patented May 7, 1929.

1,712,173

UNITED STATES PATENT OFFICE.

WILHELM SCHUMACHER, OF SOSSENHEIM, NEAR HOCHST-ON-THE-MAIN, AND CARL SEIB, OF HOCHST-ON-THE-MAIN, GERMANY, ASSIGNORS TO GRASSELLI DYESTUFF CORPORATION, OF NEW YORK, N. Y., A CORPORATION OF DELAWARE.

PROCESS OF PREPARING HOMOGENEOUS PURE 2.3 AND 2.5 DICHLORO-4-AMINO-1-METHYLBENZENE.

No Drawing. Application filed February 3, 1928, Serial No. 251,732 and in Germany March 30, 1926.

Our present invention relates to a new process of preparing homogeneous pure 2.3- and 2.5-dichloro-4-amino-1-methyl-benzene.

By causing chlorine to act upon 2-chloro-4-acetamino-1-methylbenzene in acetic acid a mixture of two isomeric dichloro-4-acetamino-1-methylbenzenes is obtained.

We have found that the two compounds can be obtained in a homogeneous form by carrying out the chlorination in the presence of acetic acid containing a certain quantity of water. Thus the 2.5-dichloro-4-acetamino-1-methylbenzene is obtained in a pure state, whereas the 2.3-dichloro-4-acetamino-1-methylbenzene which is also formed remains in the solution, from which it can be obtained in the usual manner. On saponifying the two said dichloro-4-acetamino-1-methylbenzenes there are immediately obtained pure 2.5-dichloro-4-amino-1-methylbenzene and 2.3-dichloro-4-amino-1-methylbenzene, which could hitherto not be prepared on a technical scale. Since these two bases are intermediate products for the preparation of very valuable dyestuffs, for instance azo dyestuffs, it is a considerable technical advance that they can now easily be made on a large scale.

The following example illustrates the invention, the parts being parts by weight:

1100 parts of 2-chloro-4-acetamino-1-methylbenzene of the melting point 106° C. are dissolved in 3600 parts of glacial acetic acid, to this solution are added 900 parts of water and the mass is cooled, while stirring, to 0° C. to 5° C. whereby the 2-chloro-4-acetamino-1-methylbenzene is re-precipitated. Chlorine is then introduced into this mass at the said temperature, while stirring, until there is an increase of weight of 426 parts. In the course of the chlorination process, the 2-chloro-4-acetamino-1-methylbenzene is re-dissolved and towards the end of the chlorination the 2.5-dichlor-4-acetamino-1-methylbenzene is entirely precipitated. When the chlorination is complete the mass is further stirred for some time at 0° C. to 5° C., the precipitated 2.5-dichloro-4-acetamino-1-methylbenzene is completely filtered by suction, washed with water, and the 2.3-dichloro-4-acetamino-1-methylbenzene is precipitated from the lye by the addition of water. The last-named compound is then also filtered and washed with water.

The 2.5-dichloro-4-acetamino-1-methylbenzene thus obtained melts at 138° C. to 139° C. and when once recrystallized from alcohol at 140° C. to 141° C.

The 2.3-dichloro-4-acetamino-1-methylbenzene melts at 105° C. to 108° C. and when once recrystallized from alcohol at 114° C. to 115° C.

For saponifying the two products they are heated for some time for instance with sulfuric acid of 40 per cent strength the matter which may not be dissolved is eliminated, if necessary, the mass is then made alkaline and the bases are expelled with steam.

The products can also be worked up by heating the acet compounds with sulfuric acid of for instance 40 per cent strength, eliminating if required the matter which has not been dissolved, and then cooling the clear acid solution. The sulfate which separates is filtered by suction and the base is liberated for instance by the addition of aqueous caustic soda solution. After cooling the dichlorotoluidine is filtered by suction, washed with water until there is no longer any alkaline reaction and fractionated in a vacuum.

The 2.5-diclor-4-amino-1-methylbenzene thus prepared melts at 91° C. to 92° C. and when redissolved from alcohol at 93° C. The 2.3-dichlor-4-amino-1-methylbenzene has the melting point of 40° C. to 41° C as stated in literature. On purifying the 2.3-dichlor-4-amino-1-methylbenzene by way of the hydrochloride and recrystallizing from alcohol the base prepared from the hydrochloride, the compound is obtained in the form of needles melting at 58° C. to 59° C.

We claim:

1. Process which comprises reacting 2-chloro-4-acetamino-1-methylbenzene in a mixture of glacial acetic acid and water in a proportion of about 4:1 at a subnormal temperature with chlorine and separating the resulting solid precipitate from the solution.

2. Process which comprises reacting 2-chloro-4-acetamino-1-methylbenzene in a mixture of glacial acetic acid and water in a proportion of about 4:1 at a temperature of about 0° to 5° C. with approximately one molecular equivalent of chlorine and separating the resulting solid precipitate of 2.5-dichloro-4-acetamino-1-methylbenzene from the solution containing 2.3-dichloro-4-acetamino-1-methylbenzene.

In testimony whereof, we affix our signatures.

WILHELM SCHUMACHER.
CARL SEIB.